(12) United States Patent
Peters et al.

(10) Patent No.: US 8,147,052 B2
(45) Date of Patent: Apr. 3, 2012

(54) METHOD OF FORMING SOLID INK STICK WITH CODED MARK

(75) Inventors: Anthony John Peters, Ickleford (GB); Richard Marc Watson, Harpenden (GB); Brennan Grantley John Miles, Hitchin (GB)

(73) Assignee: Xerox Corporation, Norwalk, CT (US)

( * ) Notice: Subject to any disclaimer, the term of this patent is extended or adjusted under 35 U.S.C. 154(b) by 343 days.

(21) Appl. No.: 12/620,898

(22) Filed: Nov. 18, 2009

(65) Prior Publication Data

US 2010/0075048 A1   Mar. 25, 2010

Related U.S. Application Data

(62) Division of application No. 11/497,214, filed on Aug. 1, 2006, now Pat. No. 7,631,963.

(51) Int. Cl.
    *B41J 2/175* (2006.01)
(52) U.S. Cl. ............... 347/99; 347/88; 427/256
(58) Field of Classification Search .......... 347/88, 347/99; 427/256
    See application file for complete search history.

(56) References Cited

U.S. PATENT DOCUMENTS

| 4,723,135 | A  | * | 2/1988 | Yano et al. ............ 347/20 |
| 5,223,860 | A  |   | 6/1993 | Loofbourow et al. |
| 5,406,315 | A  |   | 4/1995 | Allen et al. |
| 5,442,387 | A  |   | 8/1995 | Loofbourow et al. |
| 6,213,600 | B1 |   | 4/2001 | Kobayashi et al. |
| 6,293,638 | B1 | * | 9/2001 | McDonald ............ 347/4 |
| 6,543,867 | B1 |   | 4/2003 | Jones |
| 6,761,443 | B2 |   | 7/2004 | Jones |
| 6,840,613 | B2 |   | 1/2005 | Jones |
| 7,262,764 | B2 |   | 8/2007 | Wang et al. |
| 7,682,010 | B2 | * | 3/2010 | Lucas et al. .......... 347/99 |
| 7,753,510 | B2 | * | 7/2010 | Titterington et al. ...... 347/88 |
| 7,896,482 | B2 | * | 3/2011 | Rodriguez et al. ....... 347/88 |
| 2003/0202065 | A1 |   | 10/2003 | Jones |
| 2007/0296780 | A1 |   | 12/2007 | Jones |
| 2007/0296781 | A1 |   | 12/2007 | Jones et al. |
| 2007/0296782 | A1 |   | 12/2007 | Jones et al. |
| 2007/0296783 | A1 |   | 12/2007 | Jones |
| 2008/0088684 | A1 |   | 4/2008 | Titterington et al. |
| 2008/0088686 | A1 |   | 4/2008 | Jones et al. |
| 2008/0088688 | A1 |   | 4/2008 | Jones et al. |
| 2008/0106584 | A1 |   | 5/2008 | Jones |
| 2008/0122907 | A1 |   | 5/2008 | Jones |
| 2008/0122913 | A1 |   | 5/2008 | Jones et al. |

FOREIGN PATENT DOCUMENTS

| EP | 0934082 A1 | 6/1999 |
| EP | 1359023 A1 | 11/2003 |
| EP | 1359024 A1 | 11/2003 |

* cited by examiner

*Primary Examiner* — Matthew Luu
*Assistant Examiner* — Rut Patel
(74) *Attorney, Agent, or Firm* — Maginot, Moore & Beck, LLP

(57) ABSTRACT

A method of manufacturing an ink stick provides the ink stick with a coded mark. The method includes forming an ink stick body of a phase change ink composition, and applying a marking composition to a surface of the ink stick body to form a coded mark on the surface of the ink stick body at the marking station, the marking composition being composed of the same phase change ink composition used to form the ink stick body.

18 Claims, 6 Drawing Sheets

METHOD OF FORMING SOLID INK STICK WITH CODED MARK

CLAIM OF PRIORITY

This application claims priority from and is a divisional application of United States patent application having Ser. No. 11/497,214, which is entitled "Method of Forming Solid Ink Stick with Coded Mark" and was filed on Aug. 1, 2006. That application has issued as U.S. Pat. No. 7,631,963 on Dec. 15, 2009.

TECHNICAL FIELD

This disclosure relates generally to phase change ink jet printers, the solid ink sticks used in such ink jet printers, and the methods used to fabricate such an ink stick.

BACKGROUND

Solid ink or phase change ink printers conventionally receive ink in a solid form, either as pellets or as ink sticks. The solid ink pellets or ink sticks are placed in a feed chute and a feed mechanism delivers the solid ink to a heater assembly. Solid ink sticks are either gravity fed, belt driven or urged by a spring through the feed chute toward a heater plate in the heater assembly. The heater plate melts the solid ink impinging on the plate into a liquid that is delivered to a print head for jetting onto a recording medium. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

Phase change inks for color printing typically comprise a phase change ink carrier composition which is combined with a phase change ink compatible colorant. A color printer typically uses four colors of ink (yellow, cyan, magenta, and black). These colored inks can be formed by using a single dye or a mixture of dyes. For example, magenta can be obtained by using a mixture of Solvent Red Dyes or a composite black can be obtained by mixing several dyes. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

One problem faced in solid ink technology is differentiation and identification of ink sticks to ensure the correct loading and compatibility of an ink stick with the imaging device in which it is used. The wrong color of ink stick in a feed channel, ink sticks intended for different solid ink printers, use of non-qualified ink, etc. may impact image quality or even damage the solid ink imaging device. In previously known phase change ink systems, differentiation and identification of ink sticks was accomplished by incorporating keying features into the exterior surface of an ink stick. A corresponding key place of an ink loader acted to exclude inappropriately keyed ink sticks from being inserted into a feed channel of the printer.

World markets with various pricing and color table preferences have created a situation where multiple ink types may exist in the market simultaneously with nearly identical size/shape ink and/or ink packaging. Thus, ink sticks may appear to be substantially the same but, in fact, may be intended for different phase change printing systems due to factors such as, for example, market pricing or color table. Due to the broad range of possible ink stick configurations, marketing strategies, pricing, etc., differentiating the inks sticks so only appropriate ink is accepted by a printer requires methods of identification that go beyond physical keying. Adding conventional labels or tagging mechanisms to an ink stick is not practical, however, because tagging mechanisms may not be compatible with the phase change ink imaging device or the ink composition to which it is applied resulting in contaminated ink, blocked print heads, etc.

SUMMARY

A method of manufacturing an ink stick that increases the ways in which ink sticks may be differentiates is disclosed more fully below. The method comprises forming an ink stick body of a phase change ink composition. Once formed, the ink stick body is then transported to a marking station. At the marking station, a marking composition is applied to a surface of the ink stick body to form a coded mark on the surface of the ink stick body. The marking composition is composed of the same phase change ink composition used to form the ink stick body.

The method produces an ink stick for use in a phase change ink printer that supports more varied differentiation than previously known sticks. The ink stick comprises an ink stick body configured to fit within a feed channel of a phase change ink printer and the body has an exterior surface onto which a coded mark has been applied. The coded mark includes a coded pattern of indicia for conveying variable control/attribute information to an imaging device control system. The ink stick body and the coded mark are formed of the same phase change ink composition.

In another aspect, a system for forming solid ink sticks having a coded marker, the system comprises a forming station for forming a solid ink stick of a phase change ink composition, and a marking station for applying a marking composition to a surface of the solid ink stick to form a coded mark on the surface of the ink stick body. The coded mark encodes variable control information pertaining to the solid ink stick. The marking composition is composed of the same phase change ink composition used to form the ink stick.

In a further aspect, an ink stick for use in a phase change ink printer, the ink stick comprises an ink stick body configured to fit within a feed channel of a phase change ink imaging device. The ink stick body has a coded mark applied to the exterior surface of the ink stick body. The coded mark includes a coded pattern of indicia for conveying variable control information to an imaging device control system. The ink stick body and the coded mark are formed of the same phase change ink composition.

DETAILED DESCRIPTION OF THE PREFERRED EMBODIMENT

Figure 1:
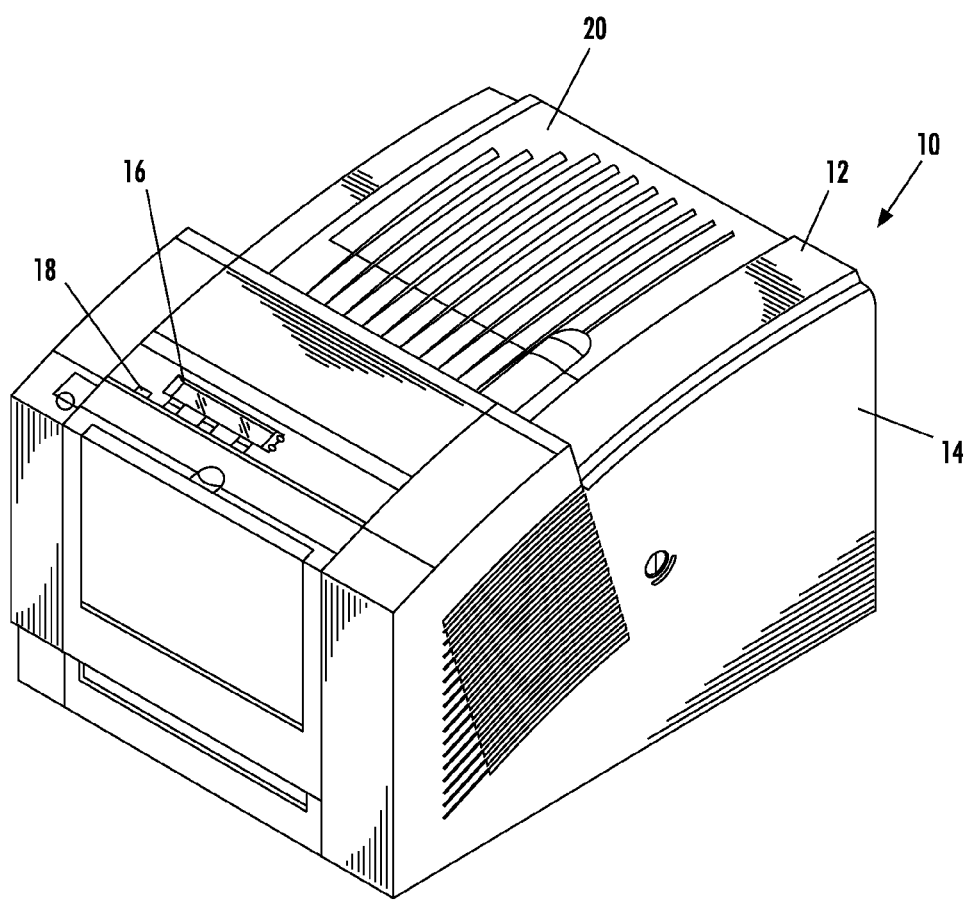
FIG. 1 is a perspective view of a phase change printer with the printer top cover closed.

For a general understanding of the present embodiments, reference is made to the drawings. In the drawings, like reference numerals have been used throughout to designate like elements.

FIG. 1 shows a solid ink, or phase change, ink printer 10 that includes an outer housing having a top surface 12 and side surfaces 14. A user interface, such as a front panel display screen 16, displays information concerning the status of the printer, and user instructions. Buttons 18 or other control elements for controlling operation of the printer are adjacent the front panel display screen, or may be at other locations on the printer. An ink jet printing mechanism (not shown) is contained inside the housing. An ink feed system delivers ink to the printing mechanism. The ink feed system is contained under the top surface of the printer housing. The top surface of the housing includes a hinged ink access cover 20 that opens as shown in FIG. 2, to provide the operator access to the ink feed system.

Figure 2:
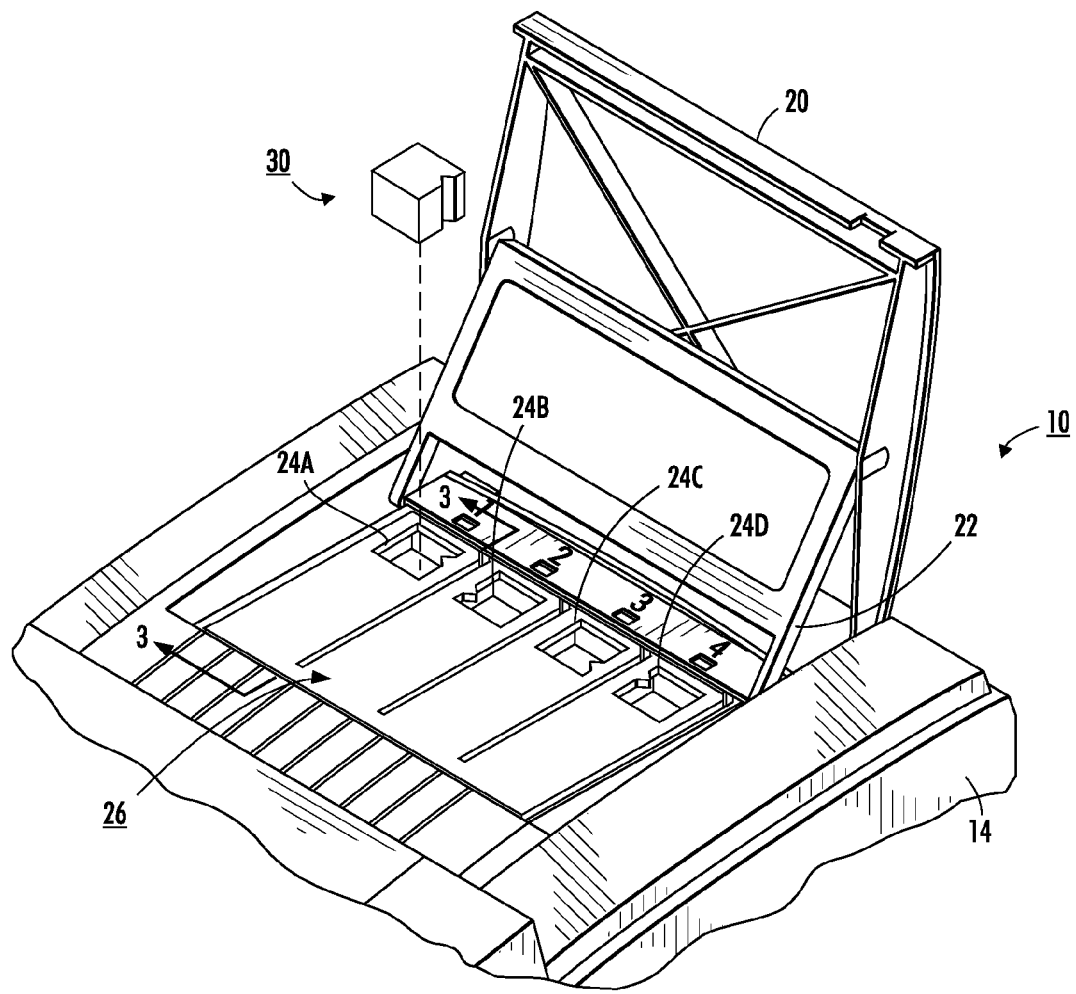
FIG. 2 is an enlarged partial top perspective view of the phase change printer with the ink access cover open, showing a solid ink stick in position to be loaded into a feed channel.

FIG. 2 illustrates the printer 10 with its ink access cover 20 raised revealing an ink load linkage element 22 and an ink stick feed assembly or ink loader. In the particular printer shown, the ink access cover 20 is attached to an ink load linkage element 22 so that when the printer ink access cover 20 is raised, the ink load linkage 22 slides and pivots to an ink load position. As seen in FIG. 2, the ink loader includes a key plate 26 having keyed openings 24. Each keyed opening 24A, 24B, 24C, 24D provides access to an insertion end of one of several individual feed channels 28 of the ink loader (see FIG. 3).

Figure 3:
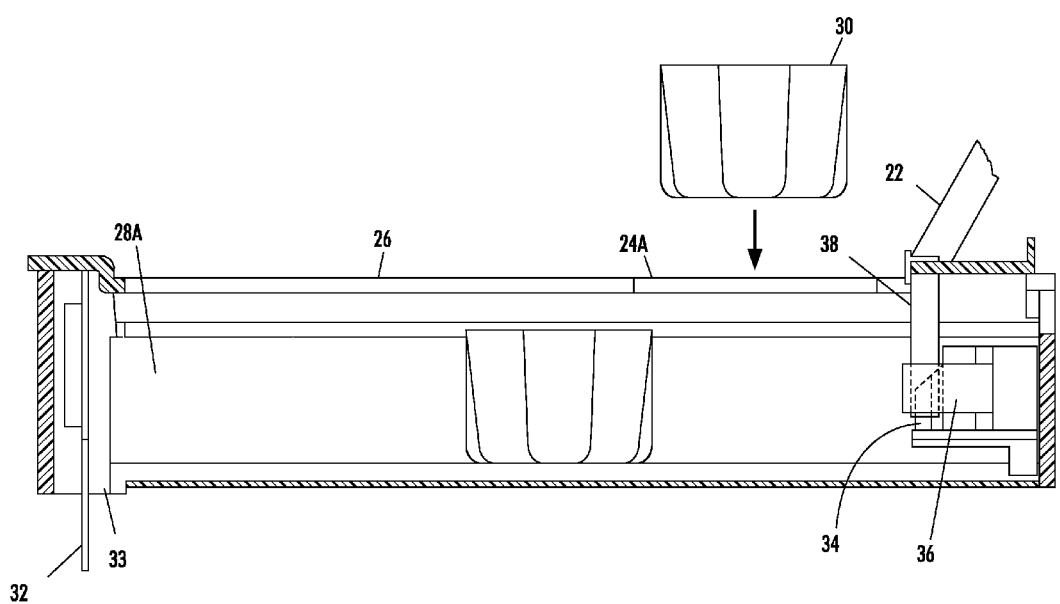
FIG. 3 is a side sectional view of a feed channel of a solid ink feed system taken along line 3-3 of FIG. 2.

Referring to FIG. 3, each feed channel, such as representative feed channel 28A is a longitudinal feed channel designed to deliver ink sticks 30 of a particular color to a corresponding melt plate 32. Although the first feed channel 28A is shown in FIG. 3, all the feed channels are identical for purposes of the following description. Each feed channel in the particular embodiment illustrated includes a drive mechanism for moving one or more ink sticks from the insertion and to the melt end of the feed channel. The drive mechanism may comprise a push block 34 driven by a constant force spring 36 to push the individual ink sticks 30 along the length of the longitudinal feed channel toward the melt plates 32 that are at the melt end of each feed channel. In the embodiment illustrated, the constant force spring 36 can be a flat spring with its face oriented along a substantially vertical axis. In another embodiment, the feed channel may be oriented substantially vertically so that gravity provides the motive force for feeding ink sticks to the melt end of the feed channel. In yet another embodiment, the drive mechanism may comprise a belt drive system in which a rotating belt is used to move ink sticks along the feed channel.

The feed channel has a longitudinal dimension from the insertion end to the melt end, and a lateral dimension, substantially perpendicular to the longitudinal dimension. The feed channel receives ink sticks inserted at the insertion end. The feed channel has sufficient longitudinal length that multiple ink sticks can be inserted into the feed channel. Each feed channel delivers ink sticks along the longitudinal length or feed direction of the channel to the corresponding melt plate at the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown).

Figure 4:
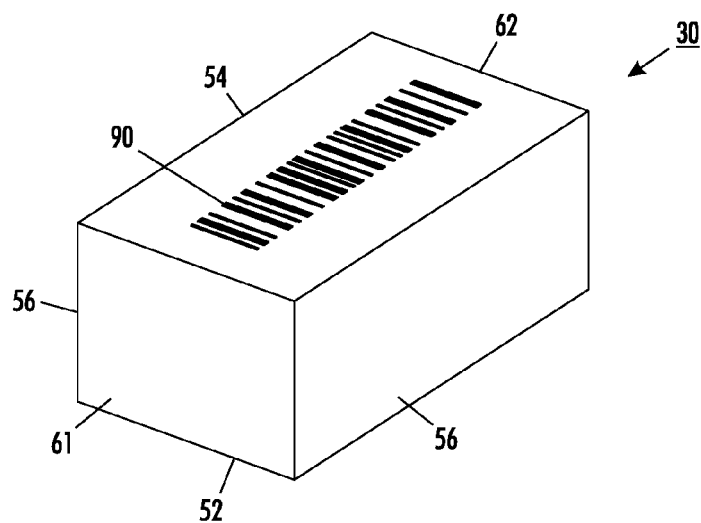
FIG. 4 is a perspective view of one embodiment of a solid ink stick.

An exemplary solid ink stick 30 for use in the ink loader is illustrated in FIG. 4. The ink stick comprises a three dimensional ink stick body having a bottom surface 52 and a top surface 54. The particular bottom surface 52 and top surface 54 illustrated are substantially parallel one another, although they can take on other contours and relative relationships. The surfaces of the ink stick body need not be flat, nor need they be parallel or perpendicular one another. However, these descriptions will aid the reader in visualizing, even though the surfaces may have three dimensional topography, or be angled with respect to one another. The ink stick body also has a plurality of side extremities, such as side surfaces 56 and end surfaces 61, 62. The illustrated embodiment includes four side surfaces, including two end surfaces 61, 62 and two lateral, side surfaces 56. The basic elements of the lateral side surfaces 56 are substantially parallel one another, and are substantially perpendicular to the top and bottom surfaces 52, 54. The end surfaces 61, 62 are also basically substantially parallel one another, and substantially perpendicular to the top and bottom surfaces, and to the lateral side surfaces. The end surface 61 is a leading end surface which contacts the melt plate at the end of a feed channel first. The end surface 62 is a trailing end surface.

The ink stick body can have a number of sides other than four. For example, the ink stick body can be formed with three, five, or virtually any number of side surfaces. These side surfaces need not be equal in length, nor is the ink stick body necessarily symmetrical about the lateral or vertical centers of gravity. The ink stick body may also be formed in shapes other than a cube or cuboid. For example, the ink stick may have an elliptical horizontal cross sectional shape, a shape having multiple straight linear sides, or even a combination of curved and linear sides. In other shapes, the ink stick body can have surfaces that are curved. For example, the ink stick body may have a cylindrical shape, with the axis of the cylinder parallel the longitudinal feed direction of the feed channel, parallel the lateral dimension of the feed channel, or perpendicular to both the longitudinal feed direction and the lateral dimension (vertical).

The ink stick body is composed of a phase change ink composition comprising a phase change ink carrier composition and a phase change ink compatible colorant. The composition should typically be a solid at room temperature and have a melting point below the operating temperature of the printing equipment that is used to apply the molten ink to a substrate. In one embodiment, a series of colored phase change inks may be formed by combining ink carrier compositions with compatible subtractive primary colorants. The subtractive primary colored phase change inks may comprise four component dyes, namely, cyan, magenta, yellow and black, although the inks are not limited to these four colors. These subtractive primary colored inks may be formed by using a single dye or a mixture of dyes. For example, magenta may be obtained by using a mixture of Solvent Red Dyes or a composite black may be obtained by mixing several dyes. Suitable carrier materials include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

As shown in FIG. 4, the solid ink stick may further include one or more coded markers 90 on a surface of the ink stick body for conveying information to a control system of an imaging device. In one embodiment, the marker 90 may comprise a coded pattern of lines, dots or symbols, such as a barcode. The marker 90 may include information that identifies the ink stick, such as a serial number, an identification code, or other index mechanism, an origin of the ink stick, ink stick formulation, date of manufacturing, stock keeping unit (SKU) number, etc. The marker may be used to embed a variety of data, such as imaging device calibration information, encrypted or unencrypted data, logos and other graphics.

In the embodiment of FIG. 4, a coded marker 90 is shown on the top surface 54 of the ink stick 30 although markers may be formed on any surface or more than one surface of the ink stick. The number and positioning of markers 90 that may be placed on an ink stick 30 are limited only by the geometry of the ink sticks and sensor placement options in an ink loader. Additionally, a marker 90 may be beneficially placed in a location on the exterior surface of an ink stick where handling damage cannot easily influence sensor interface with the ink loader such as, for example, a recess or inset portion in the exterior surface of the ink stick.

In one embodiment, information may be encoded into a marker 90 by selecting at least one unique identifier, or code word, to be indicated by a coded marker 90 and configuring the coded marker to generate a coded pattern of signals that corresponds to the selected code word(s). Any suitable encoding scheme may be implemented to embed data into the marker including, for example, standard barcode encoding schemes, or the like. A code word may comprise one or more values, alphanumeric characters, symbols, etc. that may be associated with a meaning by an imaging device control system. The code word may be assigned to indicate control and/or attribute information that pertains to an ink stick. The code word may be read by an imaging device control system and translated into the control and/or attribute information pertaining to the ink stick that may be used in a number of ways by the control system. The control system may use the code word as a lookup key for accessing data stored in a data structure, such as, for example, a database or table. The data stored in the data structure may comprise a plurality of possible code words with associated information corresponding to each code word.

In the embodiment of FIG. 4, the marker 90 is comprised of the same phase change ink composition of which the ink stick body 30 is formed. By marking an ink stick body with the same material as the ink stick itself, the stick may be marked without the drawbacks associated with "tagging" an ink stick with foreign material. For example, as mentioned above, "tagging" an ink stick with incompatible ink compositions, labels, magnetic ink strips, or the like, presents handling problems for imaging processes as the so-called tags may require additional processing to ensure that they do not interfere with operations such as by blocking print jets, contaminating the ink and/or the ink delivery system, etc. Suitable methods for the application of the marker 90 comprised of the phase change ink composition include printing, spraying, stamping, etc.

A coded marker 90 may be used in combination with keying, orientation and alignment features. This combination of optical and mechanical features may provide multiple mechanisms for identifying an ink stick. Alternatively, a coded marker used for identification and authentication purposes may be used as an alternative to keying features. Forming an ink stick without keying features may simplify the manufacturing process as substantially all ink sticks may be formed with a uniform shape regardless of color and/or printer type without the need of special equipment for forming the identification features in the ink stick.

Figure 5:
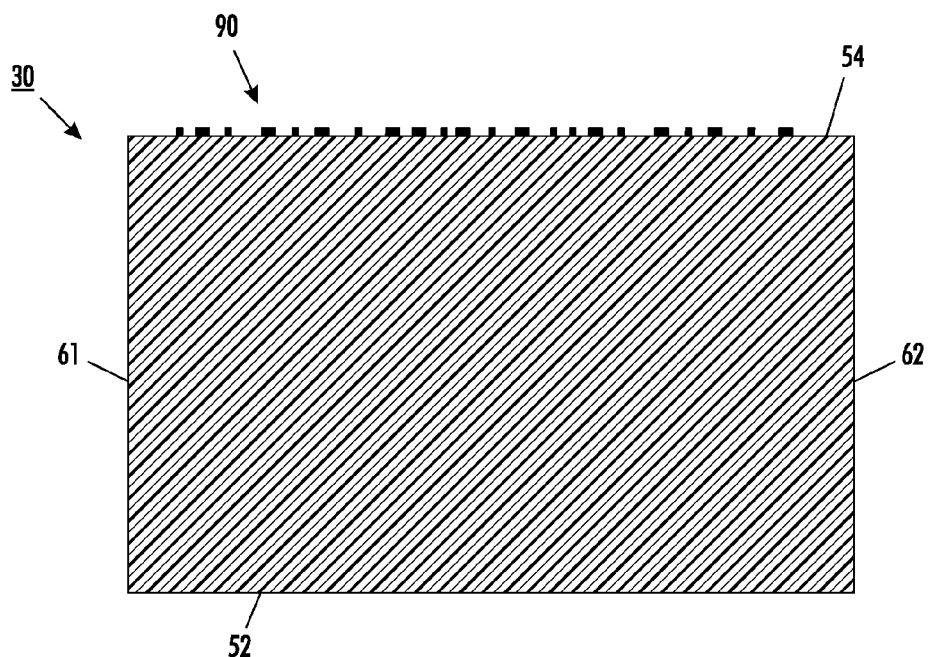
FIG. 5 is a perspective view of a coded mark of the ink stick of FIG. 4.

In order to differentiate the marker 90 from the surface of the ink stick body, the marker 90 may be applied in a manner such that an optical characteristic of the marker differs from the background material (i.e. ink stick body) to which it is applied. In one embodiment, the marker may be applied, for instance, by printing, spraying, rolling, stamping, etc., so that the marker, or portions of the marker, reflects light differently than the unmarked portions of the ink stick body. For example, the marker may be applied so that the marked areas are slightly raised relative to the surface of the ink stick to which it is applied as shown in FIG. 5. The raised areas of a mark may be formed as a single layer of the marking composition, or, alternatively, a raised mark may be formed by applying the mark in a plurality of layers in order to increase the relative thickness of the applied mark. In this embodiment, the coded signal pattern generated by this embodiment of a marker 90 may correspond to the signal strength of light reflected from the variable heights of the marker. In another embodiment, the marker may be applied in a manner such that the marked areas are textured differently than the unmarked areas of the ink stick body. The texture of a marked area may be any texture capable of scattering light differently than untextured areas of the ink stick body.

In yet another embodiment, differentiation of the marker from the ink stick body may be accomplished by treating the phase change ink composition that is used to form the coded mark before, during or after application of the mark to the ink stick. For example, by controlling the setting or drying of the ink composition used to form the mark after application of the mark, a differentiation of the appearance of the mark relative to the ink stick body may be achieved. Moreover, as described above, the coded mark may be applied by a phase change ink jet printer emitting a melted phase change ink composition onto the ink stick body. The phase change ink composition used to form the coded mark may be in solid form before being melted to liquid form to be jetted onto a surface. By controlling the temperature at which the melted phase change ink composition is maintained, the emitted ink may produce a mark exhibiting a different textures or optical characteristics.

In one embodiment, the ink stick 30 includes a coded marker 90 that may be formed using a two-stage process in which the ink stick bodies are formed, for example, by molding, extrusion, etc., then treated to a second stage during which the marker is applied to the surface of the ink stick body. Of course, a single stage manufacturing process may be implemented to form ink sticks with coded markers by, for example, incorporating the marker into the manufacturing mold used to form an ink stick. In this embodiment, however, the number of variations of the marker, and, thus, the number of possible code variations, may be limited by the number of different molds that may be used to manufacture the ink sticks. By using a two-stage manufacturing process, the number of variations of a marker may be increased to allow a significantly greater number of variations of coded markers to be applied to an ink stick than previously known.

Figure 6:
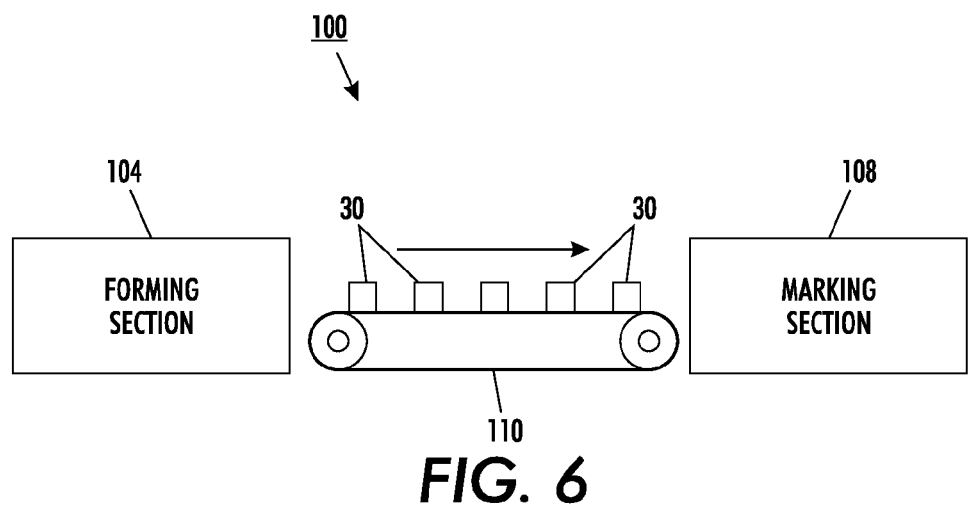
FIG. 6 is a schematic view of a system for forming solid ink sticks with a code mark.

Referring now to FIG. 6, there is shown an exemplary schematic diagram of a system 100 operable to manufacture ink sticks with a marker 90 as shown in FIG. 4. The system 100 includes an ink stick forming section 104 for forming an ink stick body and a marking station 108 for applying the marker to the ink stick body after formation. The forming section 104 may implement any suitable ink stick manufacturing method. In one embodiment, the forming section 104 comprises a formed tub and flow fill process. In this embodiment, the component dyes and carrier composition are first compounded and then heated to a liquid state and poured into a tub having an interior shape corresponding to the desired finished ink stick shape. The ink stick body, however, may be formed using any suitable method such as, for example, pour molding, injection molding, compression molding, or other techniques.

Once an ink stick body has been formed, the ink stick body is transported to the marking station for the application of the coded marker by transportation system 110. Any suitable device or method may be used for transporting an ink stick from the forming section 104 to the marking station 108, such as, for example, a conveyor belt system. Moreover, it is to be understood that the formation of the ink stick need not be proximate in time or location to the transportation to the marking station. For instance, "blank", or unmarked, ink sticks may be pre-manufactured at another location or at another time and obtained and/or transported to the marking station for application of the marker 90. Additionally, it is to be understood that ink sticks may undergo various other processes and/or marking procedures prior to or after transportation to the marking station 108. For instance, the marking station described below may be utilized to augment existing marks on an ink stick or to apply additional marks.

Figure 7:
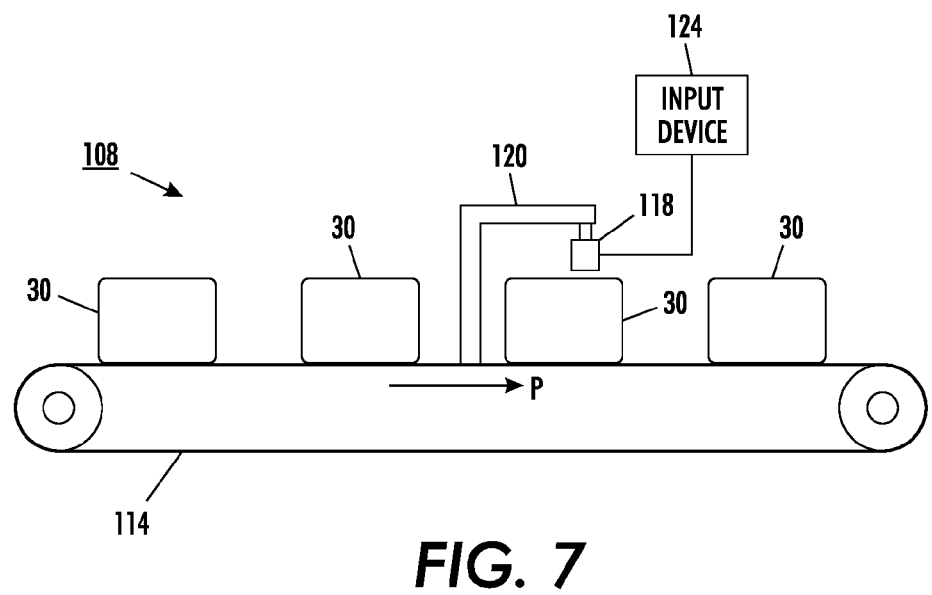
FIG. 7 is a schematic view of a marking station of the system of FIG. 6.

Referring now to FIG. 7, there is shown an exemplary schematic diagram of a marking station 108 operable to apply a code marker to a solid ink stick 30. In the embodiment, marking station 100 includes a conveyor 114. The conveyor 114 may comprise one or more conveyor belts for moving one or more ink sticks 30 through the station 108. Any suitable device or method may be used for conveying an ink stick through the marking station. The conveyor 114 may be part of a conveyer system comprised of a series of separate conveyor belts that form a continuous path from station to station in an ink stick manufacturing process.

The marking station 108 is configured to apply a marking composition to a surface of the ink stick body 30 to form a coded mark on the surface of the ink stick body. The marking composition is composed of the same phase change ink composition used to form the ink stick body. The marking composition comprising the same phase change ink composition may be applied using any suitable device or method operable to apply phase change ink to a surface of an object such as, for example, by printing, spraying, stamping, etc.

In one embodiment, the coded mark is applied to the ink stick at the marking station 108 by phase change ink jet printing. In this embodiment, the mark application station comprises a phase change ink jet device 118 arranged to print a coded mark on the ink stick bodies 30 carried by conveyor 114 in the direction of the arrow P. The ink jet device 118 is supported on a mount 120. The phase change ink jet device 118 uses a marking composition composed of the same phase change ink composition used to form the ink stick body 30. The marking composition may be in a solid stick form. The composition is changed from solid to liquid by melting the ink stick in a controlled fashion in the phase change ink jet device, to apply the ink to the ink stick body. The melted ink composition is contained in a liquid form in a reservoir at the necessary elevated temperature to maintain the ink composition in liquid form. The liquefied ink composition is then taken from the reservoir and applied when the ink stick body 30 is in position within the marking station 118.

The marking station 108 may include an input device 124 for providing the pattern data corresponding to the coded mark 90 to the marking station 108. The input device 124 may be disk drive that can, in addition to communicating the pattern data to the marking station 124, also provide permanent storage for the data. The input device 124 may also be a keyboard, a joystick, a light pen, a tape drive, a local area network (LAN) device or any other device capable of providing the pattern data to the marking station 124. In one embodiment, encoder software may be used to convert the control and/or identification data pertaining to an ink stick into an image of a coded mark, or barcode suitable for printing.

In use, pattern data for a coded mark is input into the input device 124 and communicated to marking device 118. The pattern data may be input by scanning an image or by typing the pattern data, or both, or any other suitable method for inputting the pattern data. The marking station 108 may include further systems for modifying the pattern data in a variety of ways after the pattern data is input. For instance, the pattern data may be scaled larger or smaller, or combined with other pattern data in part or in whole to form new pattern data.

In order to enhance differentiation of the coded mark from the ink stick body, the system may be configured to treat the ink stick bodies before, during and/or after application of the coded mark. For example, a thermal control station (not shown) may be provided for controlling the heating or cooling of the ink stick prior to entering the marking station. The thermal control station may promote uniform solidification of the ink material in the forming tubs by controlling the extraction of heat from the ink material. In one embodiment, the thermal control station may comprise one or more cooling tunnels for circulating air over the exterior surfaces of forming tubs for accelerating cooling of the top surface of the ink material as well as ink material adjacent to the surfaces of the cavity of the forming tubs. Alternatively, the thermal control station may operate to slow the cooling of the ink material depending on the desired level of solidification of the ink material prior to reaching the marking station 108. In another embodiment, the thermal control station may operate to cool the ink material until it has substantially solidified, and then heat the top surface of the ink material so that the ink material at the top surface is malleable in preparation for application of the coded mark. For instance, the thermal control station may include a heat lamp for heating the top surface of the solidified ink material. The malleability of the top surface is determined by the duration and intensity of the heat from the heat lamp.

In some embodiments, the coded marker may be treated after application in order to enhance differentiation. Accordingly, after application of the mark at the marking station, the conveyor system may transport the ink sticks to a curing station (not shown) for curing and/or treating the coded mark. Of course, the marking station may be configured to treat the coded mark in place at the marking station after the mark is applied to the ink stick body. The curing station employs methods that may be chosen to correspond to the heat and moisture requirements of the phase change ink composition used. Radiant heating, cooling, forced air, microwave dryers and combinations of these types are among the types available.

Figure 8:
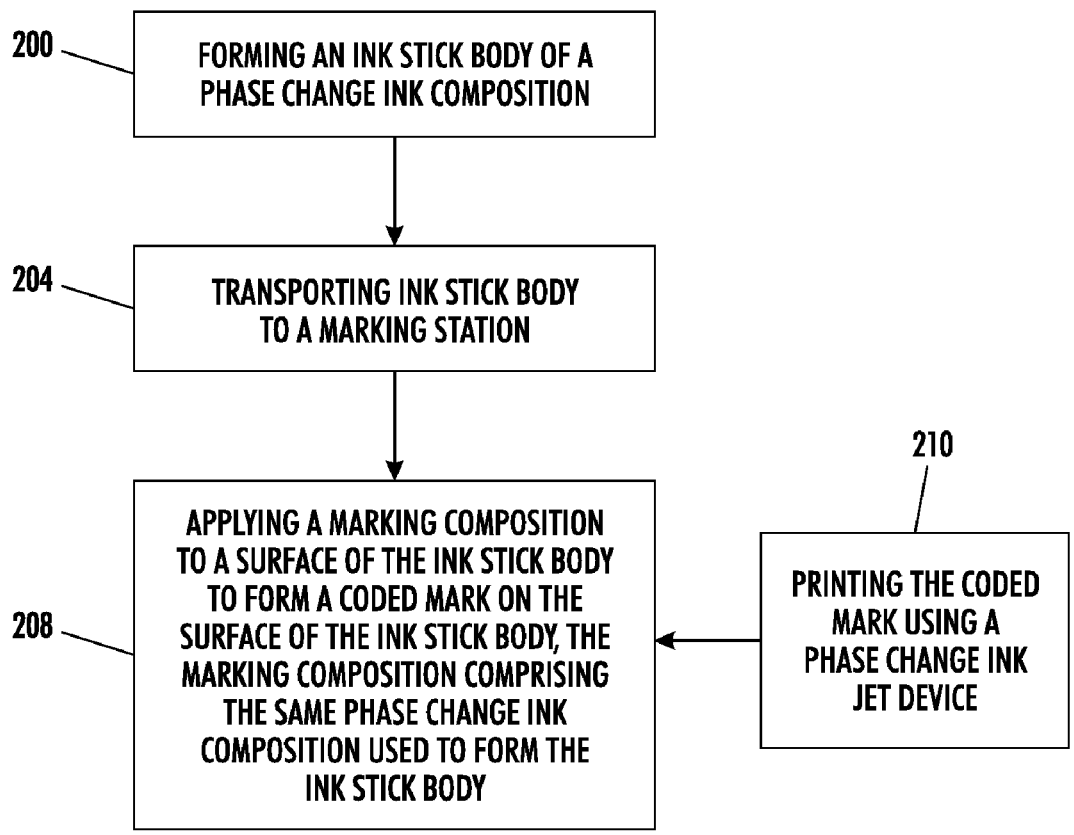
FIG. 8 is a flowchart outlining a method of forming solid ink sticks with a coded marker.

FIG. 8 is a flowchart outlining an exemplary embodiment of a method of manufacturing a solid ink stick with a coded marker. The method comprises forming an ink stick body of a phase change ink composition (block 200). Once formed, the ink stick body is transported to a marking station (block 204). At the marking station, a marking composition is applied to a surface of the ink stick body to form a coded mark on the surface of the ink stick body (block 208). The marking composition is composed of the same phase change ink composition used to form the ink stick body. In one embodiment, application of the coded mark on the ink stick body comprises printing the coded mark on the ink stick body with the phase change ink imaging device (block 210).

Alternatively, the coded mark may be stamped or sprayed on the ink stick body. In order to enhance differentiation of the coded mark from the ink stick body to facilitate detection and reading by a sensor system of an imaging device, the ink stick body and/or the phase change ink composition used to form the coded mark may be treated before, during and/or after application of the coded mark. For instance, in one embodiment, after application of the coded mark, the rate of cooling or curing of the phase change ink composition of the coded mark may be controlled. In another embodiment, the ink stick body may treated before application of the coded mark such as by heating or cooling of the ink stick body before application.

Those skilled in the art will recognize that numerous modifications can be made to the specific implementations described above. Those skilled in the art will recognize that the ink stick may be formed into numerous shapes and configurations other than those illustrated. In addition, numerous other configurations of the stations, sections and other components of the ink stick forming system can be constructed within the scope of the disclosure. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of manufacturing an ink stick, the method comprising:
    forming an ink stick body of a phase change ink composition; and
    applying a marking composition to a surface of the ink stick body to form a coded mark on the surface of the ink stick body at the marking station, the marking composition being composed of the same phase change ink composition used to form the ink stick body.

2. The method of claim 1, the application of the marking composition on the surface of the ink stick body further comprising:
    spraying the coded mark onto the surface of the ink stick body.

3. The method of claim 2, the application of the marking composition on the surface of the ink stick body further comprising:
    printing the coded mark on the ink stick body with a phase change ink imaging device.

4. The method of claim 3, the printing of the coded mark on the ink stick body further comprising:
    melting a phase change ink solid in the phase change ink imaging device; and
    jetting the melted phase change ink onto the ink stick body to form the coded mark.

5. The method of claim 1, the application of the marking composition on the surface of the ink stick body comprises:
    stamping the coded mark on the ink stick body.

6. The method of claim 1 further comprising:
    treating the coded mark after application of the coded mark on the ink stick body to differentiate the coded mark from the ink stick body.

7. The method of claim 6, the treating of the coded mark further comprises:
    controlling a rate of cooling of the phase change ink composition of the coded mark.

8. The method of claim 1 further comprising:
    treating the phase change ink composition used to form the coded mark before applying the coded mark to the ink stick body.

9. The method of claim 8, the treating of the phase change ink composition further comprises:
    varying a temperature at which the phase change ink composition is maintained when in liquid form before being applied to the ink stick body.

10. A method of marking a solid ink stick comprising:
    obtaining an unmarked ink stick comprised of a phase change ink composition; and
    applying a marking composition to a surface of the ink stick body to form a coded mark on the surface of the ink stick body at a marking station, the marking composition being composed of the same phase change ink composition used to form the ink stick body.

11. The method of claim 10, the application of the marking composition to the surface of the ink stick body further comprising:
    spraying the marking composition onto the surface of the ink stick body to form the coded mark.

12. The method of claim 11, the application of the marking composition to the surface of the ink stick body further comprising:
    printing the marking composition onto the surface of the ink stick body with a phase change ink imaging device to form the coded mark.

13. The method of claim 12, printing of the marking composition on the ink stick body further comprising:
    melting a phase change ink solid in the phase change ink imaging device; and
    jetting the melted phase change ink onto the ink stick body to form the coded mark.

14. The method of claim 10, the application of the marking composition on the surface of the ink stick body further comprising:
    stamping the marking composition on the ink stick body to form the coded mark.

15. The method of claim 10 further comprising:
    treating the coded mark on the ink stick body to differentiate the coded mark from the ink stick body.

16. The method of claim 15, the treating of the coded mark further comprising:
    controlling a rate of cooling of the marking composition of the coded mark.

17. The method of claim 10 further comprising:
    treating the marking composition used to form the coded mark before the marking composition is applied to the ink stick body.

18. The method of claim 17, the treating of the marking composition further comprising:
    varying a temperature at which the marking composition is maintained when in liquid form before being applied to the ink stick body.

* * * * *